(12) United States Patent
Moriuchi et al.

(10) Patent No.: US 11,408,125 B2
(45) Date of Patent: Aug. 9, 2022

(54) THERMOPLASTIC FIBER SHEET

(71) Applicant: TOMOEGAWA CO., LTD., Tokyo (JP)

(72) Inventors: Hideki Moriuchi, Shizuoka (JP); Hiroshi Kitahara, Shizuoka (JP); Masanori Takahata, Shizuoka (JP); Masanori Morinaga, Shizuoka (JP); Tomoki Furue, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 0 days.

(21) Appl. No.: 16/646,675

(22) PCT Filed: Sep. 19, 2018

(86) PCT No.: PCT/JP2018/034609
§ 371 (c)(1),
(2) Date: Mar. 12, 2020

(87) PCT Pub. No.: WO2019/059225
PCT Pub. Date: Mar. 28, 2019

(65) Prior Publication Data
US 2020/0270815 A1  Aug. 27, 2020

(30) Foreign Application Priority Data
Sep. 22, 2017  (JP) .............................. JP2017-182532

(51) Int. Cl.
| D21H 25/00 | (2006.01) |
| D21H 11/00 | (2006.01) |
| D21H 13/10 | (2006.01) |
| D21H 11/04 | (2006.01) |
| B32B 37/10 | (2006.01) |
| B32B 37/26 | (2006.01) |
| D21H 11/12 | (2006.01) |
| D21H 13/24 | (2006.01) |

(52) U.S. Cl.
CPC ............. D21H 11/04 (2013.01); B32B 37/10 (2013.01); B32B 37/26 (2013.01); D21H 11/00 (2013.01); D21H 11/12 (2013.01); D21H 13/10 (2013.01); D21H 13/24 (2013.01); D21H 25/005 (2013.01)

(58) Field of Classification Search
CPC ........ D21H 11/04; D21H 11/12; D21H 13/24; D21H 13/10; D21H 25/005; B32B 37/10; B32B 37/26; B32B 2260/046; B32B 5/022; B32B 2262/062; D04H 1/435; D04H 1/55; D04H 1/425; D04H 1/542; Y10T 428/249953; Y10T 428/2924
See application file for complete search history.

(56) References Cited

U.S. PATENT DOCUMENTS

| 3,039,914 | A | * | 6/1962 | Reiman ................. D21H 13/10 162/145 |
| 3,972,759 | A | * | 8/1976 | Buntin ..................... D04H 1/56 156/167 |
| 5,008,306 | A | * | 4/1991 | Goguelin ............... D21H 17/43 523/220 |
| 6,171,443 | B1 | * | 1/2001 | Goettmann .......... D04H 1/4309 162/135 |
| 7,470,639 | B2 | * | 12/2008 | Angelini ................ B01D 69/10 442/373 |
| 9,614,249 | B2 | * | 4/2017 | Fujiwara .............. H01M 50/411 |
| 9,802,187 | B2 | * | 10/2017 | Fu .......................... D04H 1/732 |
| 10,811,658 | B2 | * | 10/2020 | Yamada ............... H01M 50/411 |
| 10,889,070 | B2 | * | 1/2021 | Kondou .................. B32B 5/12 |
| 2003/0003833 | A1 |  | 1/2003 | Kurihara et al. |
| 2005/0025964 | A1 | * | 2/2005 | Fairbanks .......... D04H 1/43828 428/364 |
| 2006/0137799 | A1 | * | 6/2006 | Haque ................ D04H 1/43835 156/62.2 |
| 2007/0196637 | A1 | * | 8/2007 | Good ....................... C08J 5/043 428/297.4 |
| 2007/0232176 | A1 | * | 10/2007 | Cashin ...................... B32B 5/26 442/381 |
| 2009/0011210 | A1 | * | 1/2009 | Gao ....................... B29C 70/504 428/220 |
| 2009/0169858 | A1 | * | 7/2009 | Andersson ................ C08J 9/32 427/389.9 |
| 2012/0232211 | A1 | * | 9/2012 | Vos .......................... B32B 37/04 524/537 |
| 2015/0171397 | A1 | * | 6/2015 | Yamada ................ H01M 50/44 429/144 |
| 2016/0059525 | A1 | * | 3/2016 | Kondou ................ B29C 70/465 428/220 |
| 2017/0050390 | A1 | * | 2/2017 | Kondou ................. B29C 43/28 |

(Continued)

FOREIGN PATENT DOCUMENTS

| CA | 2398922 A1 * | 2/2003 | ................ C09J 7/21 |
| JP | H02-160996 A | 6/1990 | |

(Continued)

OTHER PUBLICATIONS

Machine Translation of JP-2012036518 A (Year: 2012).*
Machine Translation of JP-20000190627 A (Year: 2000).*
Machine Translation of JPH-09217274 A (Year: 1997).*
The extended European search report for the EP corresponding application No. 18858809.9 dated May 6, 2021.

*Primary Examiner* — Jose A Fortuna
(74) *Attorney, Agent, or Firm* — Muncy, Geissler, Olds & Lowe, P.C.

(57) ABSTRACT

A thermoplastic fiber sheet includes at least cellulosic fibers and thermoplastic resin fibers having a softening temperature of 100 to 140° C. A weight ratio of the cellulosic fibers to the thermoplastic resin fibers (the cellulosic fibers: the thermoplastic resin fibers) is 4:6 to 2:8, and porosity is 20 to 70%.

4 Claims, No Drawings

(56) References Cited

U.S. PATENT DOCUMENTS

| | | | |
|---|---|---|---|
| 2017/0050395 A1* | 2/2017 | Vos | B32B 5/08 |
| 2019/0355950 A1 | 11/2019 | Wada et al. | |
| 2020/0270815 A1* | 8/2020 | Moriuchi | D21H 13/24 |
| 2021/0123189 A1* | 4/2021 | Möhring | D21H 15/10 |
| 2021/0156060 A1* | 5/2021 | Pyun | D04H 1/64 |

FOREIGN PATENT DOCUMENTS

| | | | |
|---|---|---|---|
| JP | H03-113091 A | | 5/1991 |
| JP | H06-227560 A | | 8/1994 |
| JP | H09-191763 A | | 7/1997 |
| JP | H09-217274 A | | 8/1997 |
| JP | H10-008394 A | | 1/1998 |
| JP | 2000-190627 A | | 7/2000 |
| JP | 2002-363063 A | | 12/2002 |
| JP | 3423363 B2 | | 7/2003 |
| JP | 3547909 B2 | | 7/2004 |
| JP | 2010-067653 A | | 3/2010 |
| JP | 4629597 B2 | | 2/2011 |
| JP | 2012036518 A | | 2/2012 |
| JP | 2012-232518 A | | 11/2012 |
| JP | 2012232518 A | * | 11/2012 |
| JP | 2013-227536 A | | 11/2013 |
| TW | 201211331 A | | 3/2012 |
| TW | 201727972 A | | 8/2017 |
| WO | 02/040759 A1 | | 5/2002 |
| WO | 2012/017954 A1 | | 2/2012 |
| WO | WO-2019059225 A1 * | 3/2019 | D04H 1/542 |

* cited by examiner

THERMOPLASTIC FIBER SHEET

TECHNICAL FIELD

The present invention relates to a thermoplastic fiber sheet.

BACKGROUND ART

Various thermoplastic fiber sheets composed of cellulosic fibers and thermoplastic resin fibers have been proposed before (Patent Literature 1 to 5).

CITATION LIST

Patent Literature

Patent Literature 1: JP 4629597 B2
Patent Literature 2: JP 3547909 B2
Patent Literature 3: JP 3423363 B2
Patent Literature 4: JP H06-227560 A
Patent Literature 5: JP H02-160996 A

SUMMARY OF INVENTION

Technical Problem

Here, as to conventional thermoplastic fiber sheets, the present inventors verified availability as a thermocompression bonding sheet (for example, a sheet having an electronic component and an electronic material such as an IC as an adherend). Specifically, a test was conducted in which a thin electronic board on which an IC or the like was mounted was interposed between thermoplastic fiber sheets, and both were joined by pressure bonding under heating. At this time, the present inventors found that since the softening temperature of the thermoplastic resin fiber in the conventional thermoplastic fiber sheet is high, an event that electronic components and electronic materials lose their function frequently occurs when the thermoplastic fiber sheet is fused to the electronic components and electronic materials weak to heat. Therefore, the present inventor conducted a test again using a thermoplastic resin fiber having a low softening temperature as the thermoplastic resin fiber of the thermoplastic fiber sheet, and obtained another finding that there is a case where a situation that the electronic components and electronic materials lose their function due to heat can be prevented, but an event of a decrease in operational reliability may occur. Accordingly, an object of the present invention is to provide a thermoplastic fiber sheet that can be pressure bonded even at low temperatures and can prevent an event of a decrease in operational reliability of electronic components and electronic materials after pressure bonding.

Solution to Problem

The present inventors have verified a cause of an event of a decrease in operational reliability of an electronic component and electronic material when a thermoplastic fiber sheet using a thermoplastic resin fiber having a low softening temperature is heat-pressed and fused to the electronic component and electronic material. As a result, the present inventors have found that shape stability of the thermoplastic fiber sheet before and after the pressure bonding and water resistance after the pressure bonding lead to a decrease in the operational reliability of electronic components and electronic materials. Based on this, as a result of verifying the conditions that ensure properties of both shape stability and water resistance, from various angles such as a material constituting the thermoplastic fiber sheet, composition, structure and physical properties, the present inventors have found that the softening temperature of thermoplastic resin fibers, the blending ratio of cellulosic fibers and thermoplastic resin fibers, and the porosity of mixed paper (thermoplastic fiber sheet) composed of cellulosic fibers and thermoplastic resin fibers were important, thereby completing the present invention.

The present invention (1) is a thermoplastic fiber sheet composed of at least cellulosic fibers and thermoplastic resin fibers having a softening temperature of 100 to 140° C., in which the weight ratio of the cellulosic fibers to the thermoplastic resin fibers (the cellulosic fibers:the thermoplastic resin fibers) is 4:6 to 2:8, and the porosity is 20 to 70% or more. Here, the porosity herein is a value in a thermoplastic fiber sheet before hot pressing {for example, pressing under the conditions specified in the following present invention (3)}.

The present invention (2) is the thermoplastic fiber sheet of the above invention (1), in which the thermoplastic resin fibers are main fibers composed of one or more thermoplastic resins.

The present invention (3) is the thermoplastic fiber sheet of either one of the inventions (1) and (2), which has a property of reducing the porosity to 20% or less when the thermoplastic fiber sheet is sandwiched between metal plates made of SUS304 having a thickness of 1 mm and a size of 100×150 mm, pressed at a press temperature of 160° C. and a press pressure of 0.5 MPa for 30 minutes, and cooled to normal temperature while maintaining the pressure. In addition, the "normal temperature" referred in the present description means 20° C.

The present invention (4) is the thermoplastic fiber sheet of any one of the inventions (1) to (3) for thermocompression bonding.

Advantageous Effects of Invention

According to the present invention, it is possible to provide a thermoplastic fiber sheet that can be pressure bonded even at low temperatures and can prevent an event of a decrease in operational reliability of electronic components and electronic materials after pressure bonding.

DESCRIPTION OF EMBODIMENTS

<<Thermoplastic Fiber Sheet>>

The thermoplastic fiber sheet according to the present invention is a thermoplastic fiber sheet composed of at least cellulosic fibers and thermoplastic resin fibers having a softening temperature of 100 to 140° C., in which the weight ratio of the cellulosic fibers to the thermoplastic resin fibers (the cellulosic fibers:the thermoplastic resin fibers) is 4:6 to 2:8, and the porosity is 20 to 70%. In addition, the sheet may have a single-layer structure or a multi-layer structure. Hereinafter, each element constituting the thermoplastic fiber sheet according to the present invention, composition of each element of the thermoplastic fiber sheet according to the present invention, and properties of the thermoplastic fiber sheet according to the present invention will be described in order.

<Elements of Thermoplastic Fiber Sheet>

{Cellulose Fiber}

The cellulosic fibers of the thermoplastic fiber sheet according to the present invention are not particularly limited, for example, wood pulp such as chemical pulp such as high yield needle unbleached kraft pulp (HNKP; N material), needle bleached kraft pulp (NBKP; N material, NB material), leaf unbleached kraft pulp (LUKP; L material), and leaf bleached kraft pulp (LBKP, L material); mechanical pulp such as groundwood pulp (GP), pressurized groundwood pulp (PGW), and thermomechanical pulp (TMP); waste paper pulp such as deinking pulp (DIP) and waste pulp (WP); and semi-chemical pulp (CP); and for example, non-wood pulp such as cotton, straw, bamboo, esparto, kenaf, *Gossypium* (cotton), Manila hemp (bagasse), flax, hemp, jute, and ganpi can be used.

One of these cellulosic fibers may be used alone, or two or more of them may be used in combination. Among them, pulp of NBKP, kenaf, and Manila hemp is preferable because pulp with an appropriate fiber length is distributed and easy to make strong paper, and NBKP is particularly preferable in terms of high whiteness and easy availability.

The freeness of the cellulosic fiber is preferably from 200 to 700 ml. The freeness of the cellulosic fiber means a value of Canadian Standard Freeness (CSF), and can be measured in accordance with JIS P 8121-2: 2012 "Pulps—Determination of drainability—Part 2: "Canadian Standard" freeness method".

{Thermoplastic Resin}

The thermoplastic resin of the thermoplastic fiber sheet according to the present invention is not particularly limited as long as the softening temperature is 100° C. or more and 140° C. or less (preferable lower limit is 110° C., and preferable upper limit is 130° C.). Examples thereof include amorphous polyester, amorphous polyolefin, copolymerized polyester, high-density polyethylene, polypropylene, acrylonitrile styrene, ABS, polyvinyl chloride, PMMA, polycarbonate, ethyl cellulose, and the like. One of these thermoplastic resins may be used alone, or two or more of them may be used in combination. Here, the softening temperature can be measured by using a thermomechanical analyzer (TMA).

In addition, the thermoplastic resin of the thermoplastic fiber sheet according to the present invention may be a core-sheath fiber, in which case, as the softening temperature, the softening temperature of either the core thermoplastic resin or the sheath thermoplastic resin should be 100° C. or more and 140° C. or less (preferable lower limit is 110° C. and preferable upper limit is 130° C.), and that of the other should be 140° C. or less (preferably 130° C. or less).

<Method for Measuring Softening Temperature>

The softening temperature of the thermoplastic resin fiber can be measured, for example, by the following method. An arbitrary amount of thermoplastic resin fiber was sandwiched between metal plates made of SUS304 having a thickness of 1 mm and a size of 100×150 mm, and pressed at a press temperature of 100° C. and a press pressure of 0.1 MPa for 60 minutes to prepare a molded block of the thermoplastic resin fiber. A portion without bubbles was selected from the molded block by transmitted light observation, and a test piece having a thickness of 2 mm and a size of 5 mm square was cut out to obtain a measurement sample. The softening temperature was measured using a TMA, SS6100 manufactured by Hitachi High-Tech Science Corporation as a TMA measuring apparatus, using a 1 mmφ needle penetration probe made of quartz glass under the conditions of a temperature rising rate of 5° C./min and a load of 30 mN.

Further, as a method for extracting the thermoplastic resin fibers from the thermoplastic fiber sheet, a method of eluting the cellulosic fibers can be used. The method of eluting the cellulosic fibers is not particularly limited, and for example, the cellulosic fibers can be eluted by finely pulverizing the thermoplastic fiber sheet, sequentially immersing them in water, acetone, and an amide-based solvent (e.g., DMAc (N,N-dimethylacetamide)) at normal temperature to perform solvent substitution, swelling the cellulosic fibers, drying the solvent by vacuum drying, then immersing the cellulosic fibers in a DMAc solution in which lithium chloride is dissolved to 8 wt % at normal temperature for 24 hours. Thereafter, the softening temperature of the thermoplastic resin fiber can be measured by measuring the dried residue (thermoplastic resin fibers) by the above-described method for measuring the softening temperature.

Here, the thermoplastic resin fiber is preferably a main fiber. The main fiber herein refers to a fiber having a substantially single composition in a cross section and having no core-sheath structure. As described above, the substantially single composition may be composed of one type of thermoplastic resin, or may be composed of two or more types of thermoplastic resins.

The fineness of the thermoplastic resin fiber is preferably from 1 to 10 dtex, and more preferably from 2 to 6 dtex. When the fineness of the thermoplastic resin fiber is within the ranges, the effect of the present invention can be further enhanced. Further, the fiber length of the thermoplastic resin fiber is preferably 1 to 10 mm, and more preferably 4 to 6 mm. When the fiber length of the thermoplastic resin fiber is within the ranges, the effect of the present invention can be further enhanced. In particular, when the thermoplastic resin fiber is the copolymerized polyester fiber and has a fineness and/or fiber length in the ranges, the effect of the present invention can be further enhanced.

{Other}

The thermoplastic fiber sheet according to the present invention may contain other known components, for example, a dye, a drainage improving agent, a paper-strength enhancing agent, a mucilaginous agent, a dispersant, an antifoaming agent, a filler, and the like. Further, these components may be present between the fibers of the thermoplastic fiber sheet, on the surface or inside the thermoplastic resin fiber, or on the surface or inside the cellulosic fiber.

<Blending of Thermoplastic Fiber Sheet>

In the present invention, the weight ratio of the cellulosic fibers and the thermoplastic resin fibers (the cellulosic fibers:the thermoplastic resin fibers) is 4:6 to 2:8, and is preferably 3.5:6.5 to 2.5:7.5. When the porosity described below is within the predetermined range and the weight ratio is within the above ranges, it is possible to prevent an event of a decrease in operational reliability of electronic components and electronic materials.

<Properties>

{Porosity}

The porosity of the thermoplastic fiber sheet according to the present invention is 20 to 70%, preferably 30% or more, and more preferably 40% or more. In addition, the porosity here is a value in the thermoplastic fiber sheet before hot pressing as described above.

(Measuring Method)

Here, the porosity is a value calculated by calculating thickness (A) when the porosity is 0%, from the specific gravity, weight, and area of a test piece, measuring measured value (B) of the thickness of the test piece, and applying these values to a formula of $(1-(A/B))\times100$ [%]. When the aforementioned blending ratio of the thermoplastic fiber sheet is within the above-mentioned predetermined ranges and the porosity is within the above ranges, it is possible to prevent the event of a decrease in operational reliability of electronic components and electronic materials. Further, when the porosity is within the above ranges, a compression margin of the thermoplastic fiber sheet increases, resulting in that the pressure applied to the component is dispersed, and the risk of breakage and deformation of the component is reduced.

{Porosity Reducing Characteristics}

The thermoplastic fiber sheet according to the present invention preferably has a property of reducing the porosity to 20% or less under specific conditions, and more preferably has a property of reducing the porosity to 10% or less. When the thermoplastic fiber sheet has such properties, the effect of the present invention can be further enhanced at low pressures.

(Measuring Method)

Here, the "specific conditions" are conditions that the thermoplastic fiber sheet is sandwiched between metal plates made of SUS304 having a thickness of 1 mm and a size of 100×150 mm, pressed at a press temperature of 160° C. and a press pressure of 0.5 MPa for 30 minutes, and cooled to normal temperature while maintaining the pressure.

{Adhesive Strength after Pressing}

After superposing the thermoplastic fiber sheets and pressing them under the specific conditions, the thermoplastic fiber sheet according to the present invention has a property that the thermoplastic fiber sheets are preferably joined together with an adhesive strength of 3.5 N/cm or more, and more preferably joined together with an adhesive strength of 8.0 N/cm or more.

(Measuring Method)

Here, the adhesive strength is a value measured by stacking two thermoplastic fiber sheets having a size of 100×150 mm square, sandwiching them between metal plates made of SUS304 having a thickness of 1 mm and a size of 100×150 mm, pressing at a press temperature of 160° C. and a press pressure of 0.1 MPa for 15 minutes, cooling to normal temperature while maintaining the pressure to prepare a test piece, cutting out a measurement sample of 50×10 mm width from the center of the test piece, and peeling off the laminated thermoplastic fiber sheet on one side from an interface with a cutter knife, and performing a peeling test at a peeling angle of 180° using a push-pull scale (FB series, 20 N range) manufactured by IMADA CO., LTD.

{Shape Stability}

The thermoplastic fiber sheet according to the present invention preferably has a vertical and horizontal dimensional change rate (shape stability) of 3% or less, and more preferably 1% or less.

(Measuring Method)

Here, the shape stability is a value measured by the following method. A thermoplastic fiber sheet having a size of 50 mm square was sandwiched between metal plates made of SUS304 having a thickness of 1 mm and a size of 100×150 mm, pressed at a press temperature of 160° C. and a press pressure of 0.1 MPa for 5 minutes, and cooled to normal temperature while maintaining the pressure, to determine change in vertical and horizontal dimensions of the sample before and after pressing. Both the vertical and horizontal dimensions were measured at the center (at a position of 25 mm). For the dimension measurement, a glass reference scale (pitch: 0.1 mm, scale: 200 mm, 2000 equally, accuracy: ±0.001 mm) and a loupe were used.

{(Dimensions of thermoplastic fiber sheet after pressing)−(Dimensions of thermoplastic fiber sheet before pressing)}÷(Dimensions of thermoplastic fiber sheet before pressing)×100

In addition, the dimensional change rate (shape stability) was defined as the larger value of vertical and horizontal dimensional changes.

{Waterproof Property}

The thermoplastic fiber sheet according to the present invention preferably has water resistance. Here, the term "waterproof property" referred in the present description refers to a property in which no swelling is observed in the following test.

(Measuring Method)

A thermoplastic fiber sheet having a size of 100×150 mm was sandwiched between metal plates made of SUS304 having a thickness of 1 mm and a size of 100×150 mm, and pressed at a press temperature of 160° C. and a press pressure of 0.5 MPa for 30 minutes, and cooled to normal temperature while maintaining the pressure to prepare a sample. A 50 mm square test piece was cut out from the center of the sample, 300 ml of pure water was weighed in a 500 ml beaker, and the sample was immersed here for 1 hr. Thereafter, the sample was thoroughly wiped off to remove moisture, and it was visually observed whether water had intruded from an end face and swelling had occurred. A sample in which no swelling was observed was evaluated as ○, and a sample in which swelling was observed was evaluated as x.

{Operational Reliability of IC, Etc.}.

In applications that incorporate a sheet-type board with an IC chip or thin battery, when water intrudes into the inside, it may cause malfunction or failure when energized, or the components are subjected to rust or corrosion, whereby a problem that initial design values (for example, communication distance, frequency, etc.) cannot be satisfied may occur. It is preferable that the thermoplastic fiber sheet according to the present invention has excellent operational reliability of IC, etc.

(Measuring Method)

In the present invention, a communication propriety under specific conditions or the presence or absence of water intrusion was confirmed to determine the presence or absence of operational reliability. Here, the "specific conditions" are conditions that a laminate obtained by laminating an inlet sheet in which aluminum etching wiring is arranged on a PET film having a size of 80×50 mm and a thickness of about 45 um, mounted with an IC module having a size of 1 mm square and a height of 165 um thereon (or FelicaLiteS inlet manufactured by Smartrac having a thickness of a PET substrate of 45 um, and a thickness of an IC chip part containing the substrate, an aluminum etching part and IC chip of 210 um), with two thermoplastic fiber sheets having a size of 100×150 mm, is sandwiched between metal plates made of SUS304 having a thickness of 1 mm and a size of 100×150 mm, pressed at a press temperature of 160° C. and a press pressure of 0.5 MPa for 20 minutes, and cooled to normal temperature while maintaining the pressure. The presence or absence of water intrusion was determined by the evaluation of waterproof property described in the previous section, and the propriety of non-contact communication was determined using an NFC communication reader (PaSoRi, manufactured by Sony Corporation).

<<Method for Producing Thermoplastic Fiber Sheet>>

The thermoplastic fiber sheet according to the present invention can be produced, for example, by a known paper making method. For example, a raw material slurry is prepared by dispersing cellulosic fibers, thermoplastic resin fibers, and other components as necessary in water, and the obtained raw material slurry is subjected to wet papermaking to obtain a thermoplastic fiber sheet.

The cellulosic fibers are preferably beaten in advance. Beating can be appropriately performed using a beating machine such as a single disc refiner (SDR), a double disc refiner (DDR), or a beater.

The wet paper machine used for the wet paper machine is not particularly limited, and a paper machine applied to general paper making technology, specifically, a fourdrinier paper machine, cylinder paper machine, inclined paper machine, twin wire paper machine, or the like can be used.

A desired porosity can be obtained by adjusting the press pressure in the dehydration and drying steps in the paper-making process and a roll surface temperature in the drying step.

<<Method of Using Thermoplastic Fiber Sheet>>

The method of using the thermoplastic fiber sheet according to the present invention is not particularly limited, but preferably includes a step of adhering the thermoplastic fiber sheet to an adherend and a step of thermocompressing the thermoplastic fiber sheet to an adherend at low temperatures. Here, the "low temperature" is preferably that the heating temperature is 180° C. or less and the heating time is 30 minutes or less, more preferably that the heating temperature is 160° C. or less and the heating time is 20 minutes or less, and further preferably that the heating temperature is 140° C. or less and the heating time is 15 minutes or less. In addition, the lower limit of the heating temperature is, for example, equal to or higher than the softening temperature, and the lower limit of the heating time is, for example, 5 minutes. Also, the pressure at the time of thermocompression bonding is not particularly limited, but is preferably 0.5 MPa or less and 0.1 MPa or more. Here, as a specific use method example, for example, when laminating a thin electronic board on which an IC or the like was mounted between thermoplastic fiber sheets, a laminate obtained by laminating an inlet sheet in which aluminum etching wiring is arranged on a PET film having a size of 80×50 mm and a thickness of about 45 um, mounted with an IC module having a size of 1 mm square and a height of 165 um thereon, with two thermoplastic fiber sheets having a size of 100×150 mm, is sandwiched between metal plates made of SUS304 having a size of 100×150 mm, pressed at a press temperature of 160° C. and a press pressure of 0.5 MPa for 20 minutes, and cooled to normal temperature while maintaining the pressure, whereby it is possible to obtain a laminate having an IC part with intact operational reliability.

<<Use of Thermoplastic Fiber Sheet>>

The thermoplastic fiber sheet according to the present invention is useful as a thermocompression bonding sheet. For example, the thermoplastic fiber sheet according to the present invention can be used for hot press molding (IC card, IC tag, contact type or non-contact type communication medium incorporating a thin battery, etc.), simple bonding by thermocompression bonding, bundling (wire harness fixing), decorative molding, film insert molding, and building materials such as water-resistant wallpaper.

EXAMPLES

Production Examples

Example 1

30 Parts by weight of cellulosic fibers obtained by beating NBKP and adjusting to a Canadian standard freeness of 650 ml was dispersed in water, and 70 parts by weight of copolymerized polyester fibers (softening temperature: 110° C., fineness: 2 dtex, fiber length: 5 mm) was added thereto as thermoplastic resin fibers, then the mixture was stirred and subjected to wet paper-making to obtain a thermoplastic fiber sheet.

Example 2

The thermoplastic fiber sheet of the present invention was obtained in the same manner as in Example 1, except for using 40 parts by weight of NBKP as the cellulosic fibers, and 60 parts by weight of copolymerized polyester fibers (softening temperature: 110° C., fineness: 2 dtex, fiber length: 5 mm) as the thermoplastic resin fibers.

Example 3

The thermoplastic fiber sheet of the present invention was obtained in the same manner as in Example 1, except for using 20 parts by weight of NBKP as the cellulosic fibers, and 80 parts by weight of copolymerized polyester fibers (softening temperature: 110° C., fineness: 2 dtex, fiber length: 5 mm) as the thermoplastic resin fibers.

Example 4

The thermoplastic fiber sheet of the present invention was obtained in the same manner as in Example 1, except for using 30 parts by weight of NBKP as the cellulosic fibers, and 70 parts by weight of copolymerized polyester fibers (softening temperature: 130° C., fineness: 6 dtex, fiber length: 5 mm) as the thermoplastic resin fibers.

Example 5

The thermoplastic fiber sheet of the present invention was obtained in the same manner as in Example 1, except for using 40 parts by weight of NBKP as the cellulosic fibers, and 60 parts by weight of copolymerized polyester fibers (softening temperature: 130° C., fineness: 6 dtex, fiber length: 5 mm) as the thermoplastic resin fibers.

Example 6

Paper making was performed so that the porosity of the thermoplastic fiber sheet described in Example 5 was 67.7% to obtain the thermoplastic fiber sheet of the present invention.

Example 7

The thermoplastic fiber sheet described in Example 5 was produced and then calendar-pressed, and adjusted so that the porosity was 32.8% to obtain the thermoplastic fiber sheet of the present invention.

Example 8

Paper making was performed so that the porosity of the thermoplastic fiber sheet described in Example 1 was 24.6% to obtain the thermoplastic fiber sheet of the present invention.

Example 9

The thermoplastic fiber sheet of the present invention was obtained in the same manner as in Example 1, except for using 30 parts by weight of kenaf as the cellulosic fibers, and 70 parts by weight of copolymerized polyester fibers (softening temperature: 110° C., fineness: 2 dtex, fiber length: 5 mm) as the thermoplastic resin fibers.

Example 10

The thermoplastic fiber sheet of the present invention was obtained in the same manner as in Example 1, except for using 30 parts by weight of Manila hemp (abaca) as the cellulosic fibers, and 70 parts by weight of copolymerized polyester fibers (softening temperature: 110° C., fineness: 2 dtex, fiber length: 5 mm) as the thermoplastic resin fibers.

Example 11

The thermoplastic fiber sheet of the present invention was obtained in the same manner as in Example 1, except for using 30 parts by weight of NBKP as the cellulosic fibers, and 70 parts by weight of core-sheath resin fibers (fineness: 5 dtex, fiber length: 5 mm) having a polypropylene resin (softening temperature of 138° C.) as a core, and a polyethylene resin (softening temperature of 70° C.) as a sheath as the thermoplastic resin fibers.

Comparative Example 1

The thermoplastic fiber sheet was obtained in the same manner as in Example 1, except for using 50 parts by weight of NBKP as the cellulosic fibers, and 50 parts by weight of copolymerized polyester fibers (softening temperature: 110° C., fineness: 2 dtex, fiber length: 5 mm) as the thermoplastic resin fibers.

Comparative Example 2

The thermoplastic fiber sheet described in Comparative Example 1 was produced and then calendar-pressed, and adjusted so that the porosity was 53.5% to obtain the thermoplastic fiber sheet of the present invention.

Comparative Example 3

The thermoplastic fiber sheet of the present invention was obtained in the same manner as in Example 1, except for using 10 parts by weight of NBKP as the cellulosic fibers, and 90 parts by weight of copolymerized polyester fibers (softening temperature: 110° C., fineness: 2 dtex, fiber length: 5 mm) as the thermoplastic resin fibers.

Comparative Example 4

The thermoplastic fiber sheet of the present invention was obtained in the same manner as in Example 1, except for using 70 parts by weight of NBKP as the cellulosic fibers, and 30 parts by weight of copolymerized polyester fibers (softening temperature: 110° C., fineness: 2 dtex, fiber length: 5 mm) as the thermoplastic resin fibers.

Comparative Example 5

The thermoplastic fiber sheet of the present invention was obtained in the same manner as in Example 1, except that the thermoplastic resin fiber was not used and only NBKP was used as the cellulosic fibers.

Comparative Example 6

The thermoplastic fiber sheet described in Example 1 was cut out to a size of 100×150 mm, and was sandwiched between metal plates made of SUS304 having a thickness of 1 mm and a size of 100×150 mm, pressed at a press temperature of 120° C. and a press pressure of 0.5 MPa for 10 minutes, and cooled to normal temperature while maintaining the pressure, and adjusted so that the porosity was 16.8% to obtain the thermoplastic fiber sheet of the present invention.

Test Examples (Basis Weight)
The basis weight was determined by cutting a test piece to a size of 100 mm square, measuring the thickness and weight, and calculating the weight per 1 m².
(Thickness)
The thickness of the test piece was determined using a film thickness meter (μ-mate manufactured by Sony Corporation).
(Porosity)
It is as described in the column of "Porosity".
(Adhesive Strength)
It is as described in the column of "Adhesive Strength After Pressing".
(Shape Stability)
It is as described in the column of "Shape Stability".
(Operational Reliability of IC, Etc.)
It is as described in the column of "Operational Reliability of IC, etc.".
The results are shown in Tables 1 and 2.

TABLE 1

| Item | | Unit | Example 1 | Example 2 | Example 3 | Example 4 | Example 5 | Example 6 |
|---|---|---|---|---|---|---|---|---|
| (A) Cellulosic fiber | Type | — | NBKP | NBKP | NBKP | NBKP | NBKP | NBKP |
| | Beating degree | ml | 650 ml | 650 ml | 650 ml | 650 ml | 650 ml | 650 ml |
| (B) Thermoplastic resin fiber | softening temperature | ° C. | 110° C. | 110° C. | 110° C. | 130° C. | 130° C. | 130° C. |
| | Fineness | dtex | 2 dtex | 2 dtex | 2 dtex | 6 dtex | 6 dtex | 6 dtex |
| | Fiber length | mm | 5 mm | 5 mm | 5 mm | 5 mm | 5 mm | 5 mm |
| (A)/(B) Ratio | weight ratio | — | 3/7 | 4/6 | 2/8 | 3/7 | 4/6 | 4/6 |
| | Basis weight | g/m2 | 158 | 175 | 176 | 180 | 180 | 180 |
| | Thickness | um | 288 | 310 | 263 | 361 | 305 | 396 |
| | Porosity (before pressing) | % | 60.5 | 60.0 | 50.8 | 64.0 | 58.1 | 67.7 |
| | Porosity (after pressing) | % | 13.3 | 11.4 | 5.3 | 1.0 | 7.0 | 7.0 |
| | Adhesive strength | N/cm | ○ (No peeling) | ○ (No peeling) | ○ (No peeling) | ○ (No peeling) | ○ (8.8) | ○ (8.8) |
| | Shape stability | % | ○ (0.4%) | ○ (0.2%) | ○ (1.0%) | ○ (0.0%) | ○ (0.4%) | ○ (0.2%) |
| | Water resistance | — | ○ | ○ | ○ | ○ | ○ | ○ |

TABLE 1-continued

| Item | | Unit | Example 7 | Example 8 | Example 9 | Example 10 | Example 11 |
|---|---|---|---|---|---|---|---|
| Operational reliability (of IC, etc.) | | — | ○ | ○ | ○ | ○ | ○ |
| (A) Cellulosic fiber | Type | — | NBKP | NBKP | Kenaf | Manila hemp | NBKP |
| | Beating degree | ml | 650 ml | 650 ml | 650 ml | 650 ml | 650 ml |
| (B) Thermoplastic resin fiber | softening temperature | ° C. | 130° C. | 110° C. | 110° C. | 110° C. | 70° C., 130° C. |
| | Fineness | dtex | 6 dtex | 2.2 dtex | 2 dtex | 2 dtex | 5 dtex |
| | Fiber length | mm | 5 mm | 5 mm | 5 mm | 5 mm | 5 mm |
| (A)/(B) Ratio | weight ratio | — | 4/6 | 3/7 | 3/7 | 3/7 | 3/7 |
| Basis weight | | g/m2 | 180 | 158 | 169 | 173 | 161 |
| Thickness | | um | 190 | 151 | 398 | 301 | 302 |
| Porosity (before pressing) | | % | 32.8 | 24.6 | 69.2 | 58.5 | 59.7 |
| Porosity (after pressing) | | % | 7.0 | 13.3 | 12.3 | 2.4 | 7.2 |
| Adhesive strength | | N/cm | ○ (8.8) | ○ (No peeling) | ○ (No peeling) | ○ (No peeling) | ○ (4.8) |
| Shape stability | | % | ○ (1.1%) | ○ (1.2%) | ○ (0.3%) | ○ (0.1%) | ○ (1.8%) |
| Water resistance | | — | ○ | ○ | ○ | ○ | ○ |
| Operational reliability (of IC, etc.) | | — | ○ | ○ | ○ | ○ | ○ |

TABLE 2

| Item | | Unit | Comparative Example 1 | Comparative Example 2 | Comparative Example 3 | Comparative Example 4 | Comparative Example 5 | Comparative Example 6 |
|---|---|---|---|---|---|---|---|---|
| (A) Cellulosic fiber | Type | — | NBKP | NBKP | NBKP | NBKP | NBKP | NBKP |
| | Beating degree | ml | 650 ml | 650 ml | 650 ml | 650 ml | 650 ml | 650 ml |
| (B) Thermoplastic resin fiber | Softening temperature | ° C. | 110° C. | 110° C. | 110° C. | 110° C. | 110° C. | 110° C. |
| | Fineness | dtex | 2.2 dtex | 2.2 dtex | 2.2 dtex | 2.2 dtex | 2.2 dtex | 2 dtex |
| | Fiber length | mm | 5 mm | 5 mm | 5 mm | 5 mm | 5 mm | 5 mm |
| (A)/(B) Ratio | Weight ratio | — | 5/5 | 5/5 | 1/9 | 7/3 | 10/0 | 3/7 |
| Basis weight | | g/m2 | 169 | 169 | 168 | 167 | 164 | 158 |
| Thickness | | um | 377 | 252 | 254 | 451 | 633 | 137 |
| Porosity (before pressing) | | % | 68.9 | 53.5 | 50.4 | 73.2 | 83.7 | 16.8 |
| Porosity (after pressing) | | % | 24.6 | 24.6 | 5.3 | 44.1 | 73.4 | 9.4 |
| Adhesive strength | | N/cm | ○ (7.5) | ○ (7.5) | ○ (No peeling) | x (3.4) | x (0.1) | ○ (No peeling) |
| Shape stability | | % | ○ (0.2%) | ○ (0.2%) | x (5.4%) | ○ (0.2%) | ○ (0.0%) | ○ (0.5%) |
| Water resistance | | - | x | x | ○ | x | x | ○ |
| Operational reliability (of IC, etc.) | | - | x (Immersion) | x (Immersion) | x (Local pressure damage) | x (Immersion) | x (Immersion) | x (Local pressure damage) |

The invention claimed is:

1. A thermoplastic fiber sheet, comprising:
at least cellulosic fibers and thermoplastic resin fibers having a softening temperature of 100 to 140° C., wherein
a weight ratio of the cellulosic fibers to the thermoplastic resin fibers (the cellulosic fibers: the thermoplastic resin fibers) is 4:6 to 2:8, and porosity is 20 to 70%, and the thermoplastic resin fibers having fineness in the range from 1 to 10 dtex and fiber lengths in the range from 1 to 10 mm.

2. The thermoplastic fiber sheet according to claim 1, wherein
the thermoplastic resin fibers are main fibers composed of one or more thermoplastic resins.

3. The thermoplastic fiber sheet according to claim 1, which has a property of reducing the porosity to 20% or less when the thermoplastic fiber sheet is sandwiched between metal plates made of SUS304 having a thickness of 1 mm and a size of 100×150 mm, pressed at a press temperature of 160° C. and a press pressure of 0.5 MPa for 30 minutes, and cooled to normal temperature while maintaining the pressure.

4. The thermoplastic fiber sheet according to claim 1, wherein
the thermoplastic fiber sheet has a thickness that is ranged from 150 μm to 400 μm so that the thermoplastic fiber sheet is suitable for thermocompressing bonding.

* * * * *